Aug. 25, 1964     D. R. KING     3,145,588
DRILLING MACHINE WITH A FLUID PRESSURE FEED MOTOR
Filed Aug. 20, 1958     3 Sheets-Sheet 3
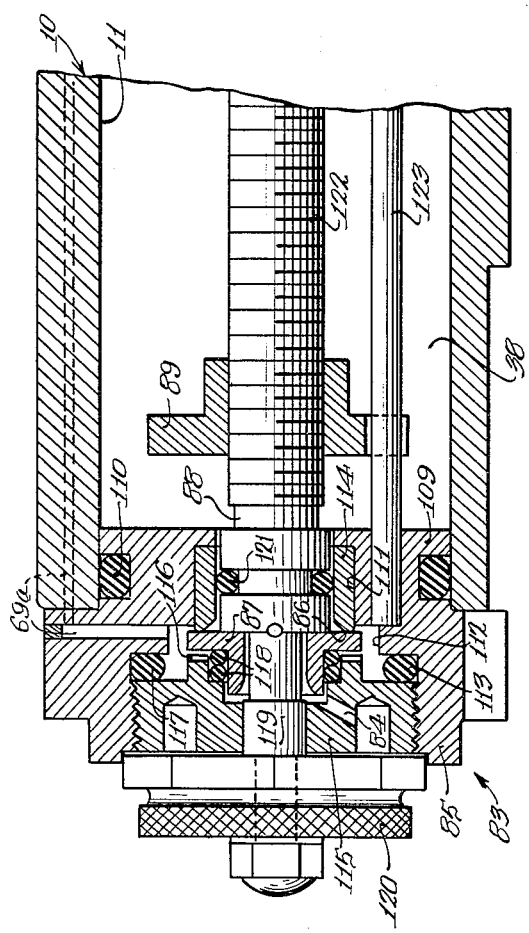
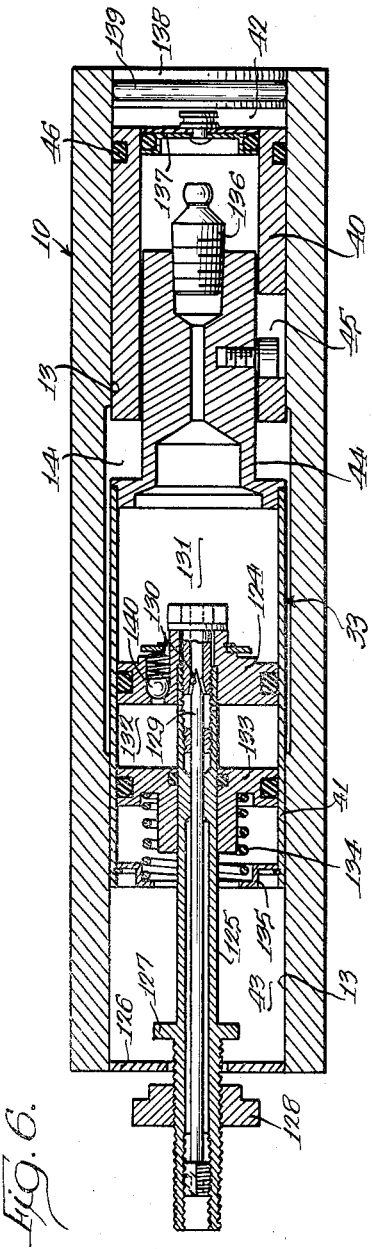
INVENTOR.
Don R. King
BY
Brown, Jackson, Boettcher
+ Dienner
Attys.

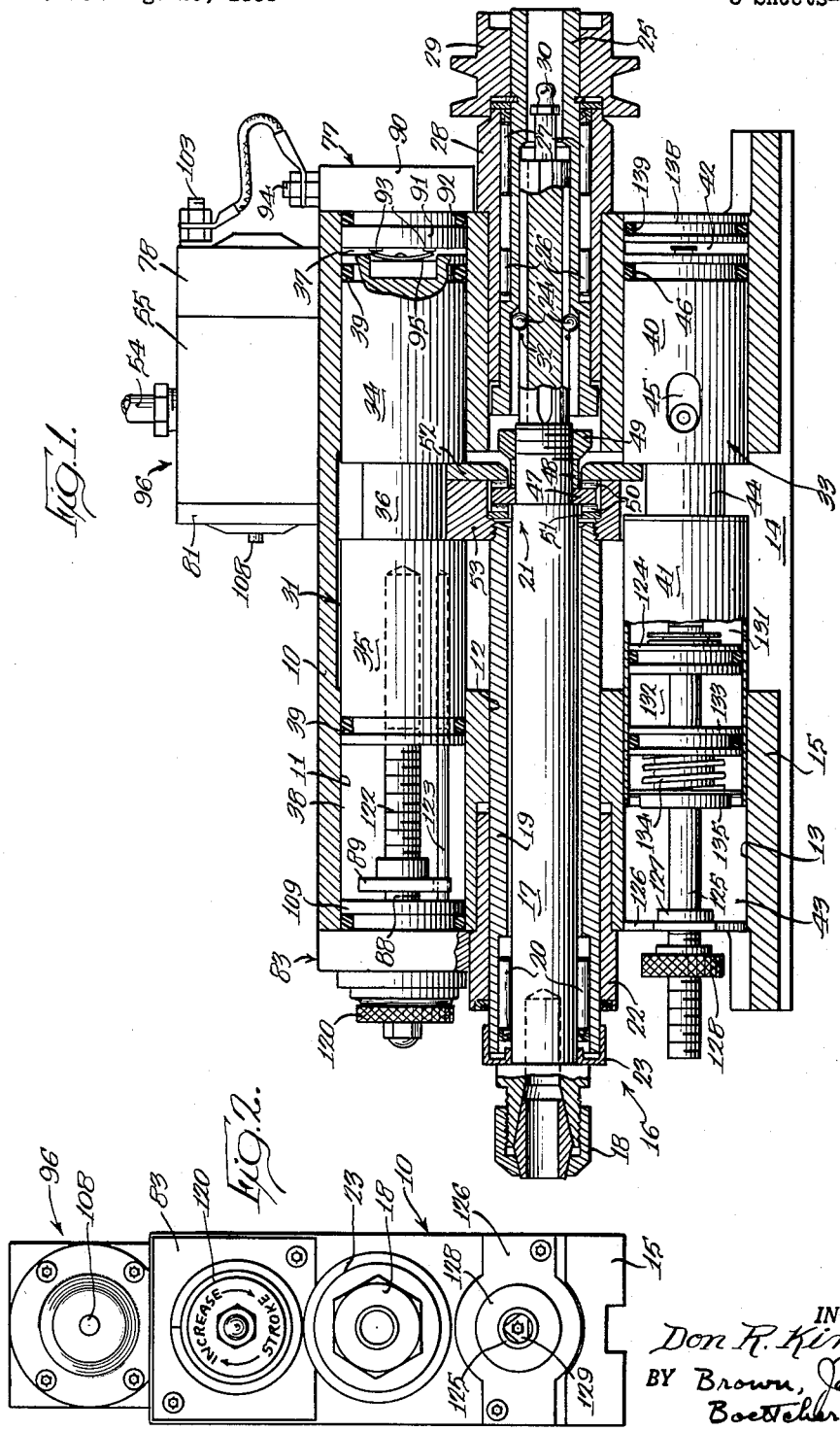

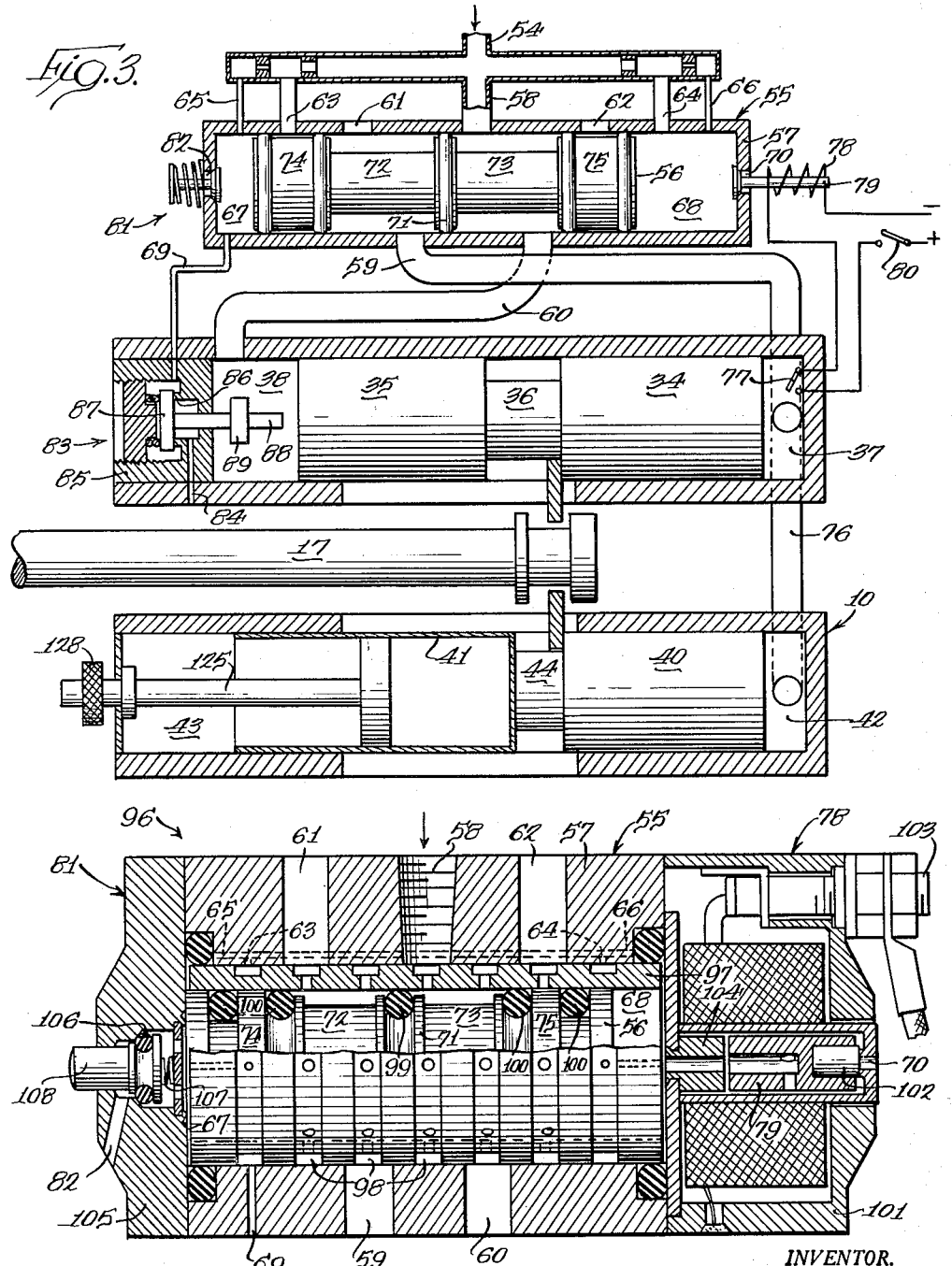

United States Patent Office 3,145,588
Patented Aug. 25, 1964

3,145,588
DRILLING MACHINE WITH A FLUID PRESSURE FEED MOTOR
Don R. King, Milwaukee, Wis., assignor to Precise Products Corporation, Racine, Wis., a corporation of Wisconsin
Filed Aug. 20, 1958, Ser. No. 756,134
7 Claims. (Cl. 77—33.5)

The present invention relates to devices for automatically advancing and retracting a drill or the like relative to a work-piece, and particularly, to an improved drill controlling unit of compact size and low cost having excellent operating characteristics and variable control over a wide range.

Automatic drill units are well known in the art and consist, basically, of a rotatable drive sleeve, a drill spindle splined to and slidable with respect to the sleeve, hydraulic or pneumatic piston means coupled to the spindle for advancing and retracting the same, means for controlling the stroke of the spindle, dash pot or like means for controlling the rate of advancement of the spindle, and means for automatically effecting retraction of the spindle upon completion of its advancing stroke. In many instances, the dash pot or like means accommodates rapid advancement of the spindle through the initial part of its stroke to bring the drill into engagement with the work-piece, then controls the rate of advancement of the drill into the work-piece during the working part of its stroke, and subsequently accommodates rapid retraction of the drill and spindle. In other disclosures, it has been proposed, for purposes of size reduction, to utilize a plurality of hydraulic or pneumatic cylinder means in parallel relation to the spindle.

It is one object of the present invention to embody all of these instrumentalities, features and control means in a single, compact, economical unit.

Another object of the invention is to provide an improved drill feed unit including a pair of piston means disposed parallel to and reciprocable with the spindle wherein both pistons are employed for advancing the spindle during its working stroke, one piston is employed for retracting the spindle.

It is also an object of the present invention to provide improved stroke adjusting and automatic reversing control means embodied in a single compact unit, the unit being characterized by extreme sensitivity of adjustment and prompt response to controlling conditions.

An additional object is the provision of control means as defined in the preceeding paragraph wherein the components of the assembly are disposed in coaxial relation along the axis of the spindle actuating piston which serves to advance and retract the spindle, thereby further to contribute to the compactness of the drill unit.

A further object of the invention is to provide an improved drill unit including a centrally disposed spindle, a piston on each side of the spindle, the defined stroke adjusting and reversing means disposed coaxial with one of the pistons and having its adjusting means exposed at one end of the assembly, thereby to afford a compact unit having its control instrumentalities accessible at a substantially common location.

Additional objects and advantages of the invention will become apparent in the following detailed description.

Now, in order to acquaint those skilled in the art with the manner of making and using my improved drill unit, I shall describe, in connection with the accompanying drawings, a preferred embodiment of said unit and a preferred manner of making and using the same.

In the drawings:

FIGURE 1 is a longitudinal sectional view of my improved automatic drill unit;

FIGURE 2 is an end elevation of the working end of the unit, the view being taken from the left side of FIGURE 1;

FIGURE 3 is a schematic representation of the pneumatic circuit of the unit;

FIGURE 4 is a longitudinal section of my improved supply valve;

FIGURE 5 is a sectional view of my improved stroke adjusting and spindle reversing control; and FIGURE 6 is a longitudinal section of my improved dash pot means.

Referring now to the drawings, and particularly to FIGURES 1 and 2, I have illustrated a preferred embodiment of my improved drill unit comprising a rectangular block-like housing 10 having three parallel bores 11, 12 and 13 therethrough, the axes of which are disposed in a common vertical plane in the illustrated position of the unit. The three bores are substantially bisected by a transverse opening 14 in the body 10 which opening extends substantially vertically upward from the lower side or base 15 of the block. The center one (12) of the three bores extends substantially along the longitudinal axis of the block 10 and is of a smaller diameter than the bores 11 and 13. The central or axial bore 12 is adapted for reception therein of the spindle assembly 16 of the unit.

The spindle assembly 16 includes a spindle 17 which is provided at its forward or left end with the usual collet or chuck 18 and which is mounted for rotation within a sleeve 19 by means of needle bearings 20 and thrust bearing 21 provided adjacent the opposite ends of the sleeve. The sleeve in turn is slidably mounted in the bore 12 and is preferably accurately guided for movement therein by a tubular bushing 22 of appreciable length, the bushing being press-fitted or otherwise secured within the housing. To seal the needle bearings at the forward end of the assembly, the spindle 17 preferably carries a tubular slinger 23 closely encircling the forward end of the sleeve 19. Rearwardly of the thrust bearing 21, the spindle 17 is splined for reception within each spline thereof of a bearing ball 24, the balls also being received in complementary internal splines in a drive sleeve 25 which is journalled by means of needle bearings 26 and 27 in a tubular bushing 28 press-fitted into the rearward end of the bore 12. The sleeve 25 extends rearwardly to the exterior of the housing and at its outer end is provided with a drive pulley 29, the pulley telescoping partially over the bushing 28 and forming a bearing sealing slinger in cooperation therewith. Within the outer end portion of the sleeve 25, the spindle 17 is provided with an axial grease fitting 30 which communicates with drilled holes in the spindle for providing lubrication for the bearing balls 24. To retain the balls in assembled relation within the splined portions of the spindle and drive sleeve, a retaining ring 32 is provided on the spindle.

As will be obvious to those skilled in the art, the bearing balls 24 couple the drive sleeve 25 to the spindle 17 for causing conjoint rotation of the two, and at the same time accommodate relative axial movement of the spindle for permitting reciprocation of the spindle relative to a work-piece without necessitating axial movement of the drive sleeve and pulley.

To effect reciprocation of the spindle, the bores 11 and 13 in the body 10 accommodate slidable reception therein of a pair of piston means 31 and 33, respectively. The piston means 31 includes a pair of piston heads 34 and 35 which are integrally or rigidly joined by an intervening stem portion 36, the assembly being of such length as to bridge the transverse opening 14 in the body thereby to provide a piston head reciprocable in each of the two cylinders 37 and 38 into which the bore 11 is divided by said opening. Each of the pistons is sealed relative to the wall of the respective cylinder by a piston ring 39, preferably an O-ring seal, and the ends of the cylinders are closed by means to be described.

The piston means 33 in the bore 13 includes a pair of relatively movable piston heads 40 and 41 which are slidably mounted, respectively, in the cylinders 42 and 43 into which the bore 13 is divided by the opening 14. The two piston heads are interconnected by a stem 44 secured to the piston head 41 and having a lost-motion connection 45 with the piston head 40. The piston 40 is similar to the pistons 34 and 35, and like them, carries a piston ring 46 in the form of an O-ring seal.

In use, the piston heads 34, 35 and 40 are effectively coupled for joint reciprocation with one another and with the spindle 17 and guide sleeve 19 by means of the thrust bearing 21. Specifically, the thrust bearing includes a ring 47 clamped to the spindle 17 between a shoulder on the spindle and a spacer 48 which is held in place by a nut 49 threaded on the spindle. The thrust bearings per se, as indicated at 50, engage the opposite sides of the ring 47 and abut respectively against a pair of bearing rings 51 and 52. The ring 51 is confined within a collar 53 which is threadedly secured to the inner end of the guide sleeve 19, and the ring 52 and collar 53 are conjointly confined between the piston heads 34 and 35 of the piston means 31. In assembly, the piston 31 is first inserted in the bore 11 whereafter the ring 52, collar 53 and the bearing elements enclosed thereby are inserted through the transverse opening 14 to bring the ring and collar into the space between the piston heads 34 and 35. The spindle 17 and sleeve 19 can then be inserted in the bore 12 from the head or forward end of the housing to extend the spindle through the bearing elements and to bring the sleeve into threaded engagement with the collar 53. The spacer 48 and nut 49 are then applied from the rear of the housing to complete the assembly and couple the spindle and sleeve to the piston 31 for conjoint reciprocation therewith. The piston 40 may then be inserted in its cylinder, whereupon the same will bear upon the ring 52.

To effect reciprocation of the spindle, fluid is first supplied to the cylinders 37 and 42 to cause movement of the pistons 34 and 40 to the left, thereby to advance the spindle 17 and sleeve 19 toward a work-piece. Due to the fact that two pistons are employed, the spindle is advanced with substantial force, even though each piston is of small size. When the advancing stroke is completed, the cylinders 37 and 42 are vented and fluid under pressure is supplied to the cylinder 38, whereupon the piston head 35 is moved to the right causing retraction of the piston 34, spindle 17 and sleeve 19. Also, since the ring 52 abuts against the piston 40, this piston is returned to the right to its original position.

By virtue of the plurality cylinder arrangement, a substantial reduction in piston diameter is achieved, which results in a compact overall assembly. This reduction in diameter permits the force operated device to be mounted close to the axis of force application, thereby reducing undesirable force moments in the assembly. The body 10 of the assembly is formed simply by three parallel bores through a common, centrally cored casting, and in the finished product affords efficient bearing surfaces for the movable components.

The fluid circuit and control means for effecting automatic supply of pressure fluid to the pistons 34, 35 and 40 is illustrated diagrammatically in FIGURE 3, wherein the inlet for fluid under pressure, preferably compressed air, is indicated at 54. The air first enters a control valve 55 of the spool type including a spool 56 reciprocable within a housing 57 for establishing communication selectively between the inlet 54 and the cylinders 37–42 and 38. The housing 57 of the valve is provided with a centrally located radial port 58 having direct communication with the inlet 54. Spaced equal distances to opposite sides thereof are ports 59 and 60 leading respectively to the cylinders 37–42 and 38. Spaced equal distances to the outsides of these ports are a pair of cylinder venting ports 61 and 62. Spaced next outwardly are auxiliary ports 63 and 64 which communicate in restricted fashion with the inlet 54, and disposed adjacent the ends of the housing are a pair of restricted ports 65 and 66 which also communicate with the inlet 54. The latter ports communicate continuously with pressure chambers 67 and 68, respectively, provided at the opposite ends of the housing, which chambers are provided with normally closed vent ports 69 and 70, respectively.

The spool 56 of the valve is of a length slightly greater than the spacing between the auxiliary ports 63 and 64 and is provided centrally thereof with a sealing land 71. To opposite sides of this land, the spool includes circumferential recesses 72 and 73 which serve, when the land 71 is shifted to one side or the other of the central port 58, to establish communication between the inlet 54 and one of the ports 59 and 60 and to establish communication between the other of said ports 59 and 60 and its respective venting port 61 or 62. Outwardly of the recesses 72 and 73, the spool includes sealing lands 74 and 75, the land 74 sealing the port 63 and the land 75 sealing the port 62 when the spool is shifted to the left, and the land 74 sealing the port 61 and the land 75 sealing the port 64 when the spool is shifted to the right.

The ports 65 and 66 supply fluid under pressure to the opposite ends of the spool 56 and the auxiliary ports 63 and 64 are provided to assist in supplying pressure fluid to the ends of the spool for assuring actuation thereof, the spool being movable in response to venting of the chamber 67 or 68 that at the moment is the larger, i.e., the chamber at the end of the spool opposite the direction in which the spool was last shifted. Specifically, as illustrated in FIGURE 3, the spool 56 is shifted toward the left end of the housing 57 and the chamber 68 to the right of the spool is the larger. In this position, fluid under pressure is supplied through the inlet 54, port 58, recess 73 and port 60 to the cylinder 38, thereby to cause the piston 35 to retract the piston and spindle assembly. At the same time, the cylinders 37 and 42, which are interconnected by a conduit 76, suitably a bore in the body 10, are commonly vented through the port 59, recess 72 and port 61 thereby to accommodate retraction of the spindle. Also, pressure fluid is supplied at this time to the left-hand pressure chamber 67 through the port 65 and to the right-hand chamber 68 through the ports 64 and 66. Assuming that the right-hand end of the housing is now vented to atmosphere through the port 70, the spool will commence moving to the right due to the greater pressure exerted on the left-hand end thereof. As the spool reaches its central position, it starts to close the port 64 and open the port 63 whereupon fluid under pressure is supplied to the left end of the spool rapidly to shift the spool to the right past its critical center position. Subsequently, the chamber at the right of the spool may be closed (the vent to atmosphere discontinued), whereupon fluid pressure will be equalized at both ends of the spool and the spool will maintain its position until the chamber at the left of the spool is vented, whereupon the spool will be shifted to the left.

The auxiliary ports 63 and 64, which are provided according to the present invention, afford excellent mitigation of the previously encountered problem of the spool sticking or stopping in its neutral position, even when the valve tends to be sluggish in operation due to adverse operating conditions. The effect of these ports is to provide a pneumatic overcenter mechanism for momentarily accentuating the pressure differential at opposite ends of the spool, thereby to assure complete shifting of the spool.

As sketched in FIGURE 3, the control valve 56 is positioned to effect retraction of the spindle 17 and the piston means 31 and 33 connected thereto. As the spindle reaches its fully retracted position, the advancing piston 34 is effective to close a control switch 77, which upon being closed, conditions a solenoid 78 for operation. The solenoid 78 includes an armature 79 which, upon energization of the coil of the solenoid, is adapted to open the vent port 70 of the chamber 68 at the right-hand end of the spool valve. Since opening of the port 70 will effect shifting of the spool 56 and supply a pressure fluid to the advancing cylinders 37 and 42, the solenoid 78 is also under the control of a master switch 80 which may be a manually actuated switch or a switch that is automatically actuated in response to placing a fresh workpiece in proper position relative to the drill unit, as is known in the art.

When the master switch 80 is closed, assuming that the control switch 77 is also closed, the solenoid 78 is energized to open the vent port 70. The two switches thus serve as a safety interlock to prevent accidental energization of the solenoid and inadvertent movement of the spindle. Upon opening of the port 70, the spool 56 is shifted to the right in the manner described, whereupon the spool land 71 is shifted to the right of the port 58 to cause compressed air to be supplied to the cylinders 37 and 42 and to cause the cylinder 38 to be vented through the port 62, whereupon the piston means 31 and 33 and the spindle 17 are advanced to the left to perform useful work, the two advancing pistons 34 and 40 being capable of exerting substantial force during the advancing stroke.

As the spindle moves forward in its advancing stroke, I provide means whereby the advancement of the spindle may be halted and the same retracted either automatically or in response to manual control. The manual control means consists of a normally closed valve 81 which controls an auxiliary vent port 82 for the chamber 67 at the left end of the spool, the valve 81 upon being depressed manually, venting the chamber 67 to cause shifting of the spool and reversal of spindle movement at any point in the advancing stroke of the spindle.

The means for automatically halting the spindle for retraction thereof after a predetermined advancing stroke is embodied in the end wall of the retracting cylinder 38 and comprises a vent valve 83 for controlling communication between the vent port 69 and a port 84 leading to atmosphere. The valve 83 includes a housing 85, a valve seat 86 in the housing, a valve member 87 normally engaging the seat, a stem 88 on the valve extending inwardly of the cylinder 38 toward the retracting piston 35, and an abutment 89 on the stem disposed for engagement by the piston 35. As the retracting piston 35 engages the abutment 89, the valve member 87 is disengaged from its seat to vent the left end of the spool valve, whereupon the spool shifts to the left in the manner previously described. The housing 85 of the valve includes means for limiting movement of the valve member 87 to a very minute distance, no more than a few thousandths of an inch, which means also serves as a stop for the stem 88 and the abutment 89, whereby the piston means and the spindle are positively stopped in a predetermined position, after which the spindle is retracted by virtue of admission of compressed air to the cylinder 38 and venting of the cylinders 37 and 42.

When the piston means and spindle are again fully retracted, the switch 77 is closed by the piston 34 thereby to condition the drill unit for repetition of its automatic advancement and retraction cycle.

A preferred embodiment of the control switch 77 is illustrated in FIGURE 1 as being embodied in part in an end closure for the right-hand or head end of the advancing cylinder 37. Specifically, an end closure is provided comprising a metallic block 90 having an integral cylindrical extension 91 adapted to be fitted in the end of the cylinder 37 (i.e., the right end of the bore 11), the extension having a circumferential groove therein receiving an O-ring seal 92 for sealing between the cylinder and the block. The block 90 engages the end face of the body 10 of the unit and is secured thereto, preferably by bolts. Within the extension 91, the block carries a pair of insulated conductors terminating in a pair of spaced contacts 93 at the inner face of the extension, the conductors extending to the exterior of the block, preferably at the upper side thereof, and being electrically connected to a pair of terminal posts 94. The end face of the piston 34 which reciprocates within the cylinder 37 is recessed, and within this recess is mounted, in insulated relation to the piston, a bowed spring contact 95 adapted to engage and close the circuit between the contacts 93 when the piston is in its fully retracted position. Thus the switch means 77 is disposed coaxial with the piston means 31 to reduce space requirements, and to serve also as the head of the cylinder 37.

The solenoid 78 which is controlled by the switch 77 preferably constitutes part of a compact control assembly 96, a preferred embodiment of which is illustrated in FIGURE 4.

In its preferred form, the assembly 96 includes an outer section and two end sections, the center section comprising the air control valve 55, one end section comprising the manually actuated valve 81 and the other end section comprising the solenoid 78 and the valve means actuated thereby. The central section is defined by the housing 57 of the valve means 55, which housing is provided with a longitudinal bore for reception of the spool valve and drilled holes communicating with said bore and comprising the previously described ports 58 to 64 and 69. The body is also provided with small longitudinal holes therein comprising the ports 65 and 66. Mounted securely within the said longitudinal bore is a port sleeve 97, the outer surface of which is provided with a plurality of circumferential grooves or recesses 98, each communicating with a respective one of the ports 58 to 64. Within each of the grooves 98, the sleeve is provided with small radial holes constituting port means, the number of holes being appropriately selected to afford restricted or substantially unrestricted fluid flow as desired or required. For example, as illustrated in FIGURE 4, a relatively large number of holes are provided in the sleeve in communication with each of the grooves 98 that communicate with the ports 58 to 62, whereas only a few holes are provided in communication with the grooves that are aligned with the ports 63 and 64, thereby to afford a relatively restricted flow of fluid through these latter ports. In this manner, the sleeve 97 facilitates manufacture of the valve body and assures accurate formation of ports of a given area. Also, the inner wall of the sleeve can be machined, and if necessary lapped, to exceedingly close tolerances at relatively small cost to afford an accurate bearing surface for the spool 56. The spool 56 is slidably mounted in the interior of the sleeve 97 and includes, as previously noted, a central land 71, a pair of circumferentially recessed portions 72 and 73 and a pair of end lands 74 and 75. The center land 71 is preferably defined between a pair of radial flanges which constitute means for retaining in position an O-ring seal 99, which in turn effectively comprise the land 71. At each end of the lands 74 and 75, the spool is provided with a circumferential recess for reception therein of an O-ring seal 100 for sealing each land relative to the sleeve 97. Operation of the spool valve to control the ports 58 to 64 is believed to be obvious from the preceding description.

The solenoid assembly 78 is disposed with a metallic body 101 which constitutes an end cap for the valve housing 57. Body 101, at the face thereof adjacent the housing 57, is spaced from the sleeve 97 to define the spool valve end chamber 68, with which chamber the port 66 communicates. At its other face, the body 101 includes a centrally apertured end wall defining the port 70 and an inwardly facing concentric valve seat 102. The coil of the solenoid is mounted within the body 101 in coaxial relation to the port 70, and the body carries terminal post means 103 to which the coil is connected. Within the interior of the coil, the solenoid includes a fixed core 104 and a reciprocable armature 79, the armature being normally biased away from the core and toward the valve seat 102 and carrying at its free end a sealing disc normally engaging the seat 102. The core 104 has an axial bore therethrough communicating with the chamber 68 and communicating through and around the armature 79 with the port. In the normal position thereof, the armature seals off the port 70 and is retained in sealing relation to the port by the air pressure within the chamber 68, thereby to guard against accidental venting of the chamber. Upon energization of the solenoid coil, the armature is moved away from the seat 102 toward the core 104, thereby to vent the chamber 68 to atmosphere.

The manual venting valve 81 for the other end of the spool is similarly housed within a metallic body 105 constituting an end cap for the left end of the valve housing 57. The body is provided with an axial bore defining the auxiliary vent port 82, and is counter-bored at the inner face thereof to define the spool valve end chamber 67 with which the port 65 communicates. Within the interior thereof, the body defines an inwardly facing valve seat 106 on which the valve 81 normally seats, the valve being biased to its seat by a spring 107 and normally being retained thereon by air pressure in the chamber 67. The valve 81 includes a stem 108 extending axially to the exterior of the body 105, thereby to provide a push button by means of which the valve may be manually actuated. Preferably, the vent port 82 is directed downwardly through the body 105 so that air will not be discharged against the operator or a passer-by.

The assembly of the three housing or body members 57, 101 and 105 is preferably effected by means of bolts, and the assembly 96 is preferably bolted in sealed relation to the upper surface of the main body 10 of the unit adjacent the rearward end thereof. The ports 59, 60 and 69 in the valve housing 57 extend through the lower wall of the housing and communicate respectively with aligned passages drilled in the body 10 and leading in a known manner to the cylinders 37-42, the cylinder 38 and the automatic reversing valve 83.

The automatic reversing valve 83 in its preferred embodiment comprises an end closure for the retracting cylinder 38, and is represented in such form in FIGURE 1 and in greater detail in FIGURE 5. The body 85 of the valve is of generally block-like form and includes a cylindrical extension 109 adapted to fit intimately into the end of the cylinder 38, i.e., the left end of the bore 11 in the block 10. Adjacent the base thereof, the extension 109 is provided with a circumferential groove for reception of an O-ring seal 110 for sealing the body 85 relative to the block 10, the body suitably being bolted to the block. The body 85 of the valve is provided with a stepped axial bore defining three adjacent chambers 111, 112, and 113. The chamber 111, which is disposed innermost, houses an annular member 114 which defines an outwardly facing valve seat 86. Disposed within the central chamber 112 is the valve member 87 which cooperates with and normally engages the seat 86. Immediately outwardly of the valve, a plug 115 is adjustably threaded into the chamber 113, the plug including annularly arranged extensions 116 which are disposed for engagement by the valve to limit movement thereof. In assembly of the valve, the plug 115 is sealed relative to the body 85 by an O-ring seal 117 and is threaded into the chamber 113 to such extent as to limit movement of the valve to no more than a few thousandths of an inch, preferably no more than from about .001 inch to about .0015 inch. The valve member 87 is sealed relative to the plug 115 by means of O-ring seals 118 which are confined both radially and axially between the plug and the valve and which, in addition to their sealing function, serve normally to bias the valve onto its seat.

The valve member and plug are axially bored for the free slidable passage therethrough of a reduced extension 119 of the valve stem 88, the extension projecting to the exterior of the unit and carrying at its outer end an adjusting knob 120. Immediately inwardly of the valve member 87, the stem 88 is enlarged to define a shoulder abutting the valve member and acting to couple the valve member and stem for conjoint movement. This enlarged portion of the stem extends through the annular member 114, and in the portion thereof within said member carries a seal 121 for sealing the interior of the valve unit from the cylinder 38. The stem 88 projects into the cylinder 38 and is provided on its inner end portion with a screw thread 122. The abutment member 89 is threaded on the portion 122 of the stem 88 and is retained against rotation by a rod 123 secured to the valve body 85 eccentrically of the stem 88, the rod projecting freely through a hole in the abutment member. To accomodate the stem 88 and rod 123, the piston 35 in the cylinder 38 is provided with suitable longitudinal bores aligned respectively with the stem and the rod, as is indicated by dotted lines in FIGURE 1.

By virtue of the described construction of the unit 83, the knob 120 is adapted to be rotated manually to move the abutment member 89 longitudinally along the screw 122. Since the member 89 is disposed in the path of movement of the piston 35 and engageable thereby, rotation of the knob 120 results in adjustment of the length of the stroke of the spindle and piston assembly, thereby to vary the depth of hole drilled by the unit. The abutment member 89 is preferably adjustable throughout a substantial range to accommodate wide variation in the depth of hole drilled by the unit.

With the abutment member 89 adjusted as desired or required for a particular job, the piston 35, as it advances with the spindle 17, engages the member 89 and moves said member and the stem 88 toward the left as viewed in FIGURES 1 and 5. The shoulder on the stem 88 thereupon causes the valve member 87 to be unseated, whereupon fluid communication is established between a continuation 69a of the vent port 69 and the port 84. The port continuation 69a is formed in the body 85 of the valve, the same communicating at one end with the drilled passageway in the main body 10 of the drill unit that communicates with the port 69 and leading to the valve chamber 112. The port 84 is formed in the valve plug 115 and normally establishes communication between atmosphere and the opposite side of the valve 87. Upon unseating of the valve, communication between the chamber 112 and the port 84 is established by virtue of radial clearance between the valve member 87 and its stem 88, thereby to vent the chamber 67 at the left end of the spool valve to atmosphere and to effect, in due course, automatic retraction of the spindle.

In addition to performing the automatic reversing function above described, the unit 83 constitutes a highly sensitive means for accurately determining the exact point of cessation of the spindle advancing stroke. Specifically, when the valve is unseated, it abuts against the plug 115 whereby the piston 35, through the intermediary of the valve member and its stem, is positively held against further advancement. Since the plug accommodates only from about .001 inch to about .0015 inch of movement after the piston 35 first engages the abutment 89, it is apparent (a) that the drill spindle cannot advance any further than that regardless of the period of delay before commencement of the retracting stroke, and (b) that the drill spindle must advance at least (and exactly) that far before retraction commences irrespective of the rapidity with which the reversing and supply valves perform their functions. Thus, the automatic reversing and stroke adjusting unit of the invention is seen to compel the drilling of a hole to highly exacting tolerances, and yet and the reversing valve operates to cause reverse movement of the pistons and retraction of the drill from the work.

During the initial portion of the retracting stroke, the pistons 34, 35 and 40 again have lost-motion relative to the piston 41 of the retarding means, whereby retraction commences promptly at relatively high speed. When the piston 40 has taken up its lost-motion relative to the stem 44, the pistons 41 and 124 are moved conjointly with the piston 40 at a continued high rate of speed until the adjustable stop means 128 on the piston rod 125 engages the guide member 126. At this time, a slight increase of pressure occurs in the chamber 132 and a slight decrease in pressure occurs in the chamber 131, to afford a pressure differential sufficient to cause unseating of a ball check valve 140 mounted in the piston 134. As illustrated in FIGURE 6, the check valve 140 seats in the direction toward the chamber 132 and is thereby normally retained closed, first by its biasing spring when there is little or no differential in pressure between the two chambers, and second, by virtue of the higher pressure in the chamber 131 during the advancing stroke. When the check valve opens, it accommodates rapid return of fluid from the chamber 132 to the chamber 131, whereby retraction of the spindle continues at a relatively rapid rate until the piston 34 closes the switch means 77, thereby completing the retraction stroke.

By way of example of the control afforded by the above described means, assume that the unit is to be employed for drilling a hole ½ inch deep in each of a number of work-pieces that are each to be disposed ¾ inch away from the drill when the drill is fully retracted. In this case, the stroke control knob 120 would be manipulated to adjust the overall stroke of the drill to 1¼ inches; an Allen head wrench would be inserted in the piston rod 125 to adjust the needle valve 129 to afford a predetermined rate of controlled advancement of the spindle; and the control knob 128 would be adjusted to accommodate advancement of the spindle ¾ inch or slightly less before the retarding means would be brought into play. Note that all of these adjustments are effected in a most convenient manner from one end of the machine and that the controls are disposed axially of the piston means 31 and 33 closely adjacent the drill spindle. For mass production purposes, the master switch 80 of my drill unit may be mounted to be closed automatically upon positioning of a work-piece in intended relation to the drill. Alternatively, the switch may be foot actuated, thus to leave the operator's hands free for handling work-pieces.

By virtue of the described adjustments of my drill unit, the unit will automatically drill to the most exacting tolerances the said ¾ inch deep hole in each of the work-pieces. In the event that the operator initiates a cycle of the device inadvertently, or if he notices that a work-piece is not properly positioned relative to the drill, he can manually cause prompt retraction of the drill before the work-piece is ruined by simply pushing the manual control button 108. This button is purposely disposed remotely of the spindle and at the outer or free side of the unit, so that the operator can react promptly to emergency situations without endangering his bodily welfare.

From the foregoing, it is believed apparent that all of the objects and advantages of the present invention are attained in a highly convenient, economical and practical manner, and that the invention affords an exceedingly compact drill unit of improved construction and operational characteristics. Moreover, while I have shown and described what I regard to be the preferred embodiment of my invention, it is to be appreciated that various changes, rearrangements and modifications may be made therein without departing from the scope of the invention, as defined by the appended claims.

I claim:

1. In an automatic drill unit or the like having piston and cylinder means for advancing and retracting a drill spindle, fluid pressure responsive means for supplying pressure fluid to the piston and cylinder means and a vent valve actuated by the piston upon its spindle advancing stroke for controlling said fluid pressure responsive means to cause retraction of the spindle, the improvement comprising a vent valve mounted in said cylinder adjacent one end thereof, said valve including a valve seat, a valve member, means normally retaining said valve member in engagement with said valve seat, means limiting movement of said valve member away from said seat, a stem extending in an axial direction through said vent valve from the exterior thereof to the interior of said cylinder and toward said piston, and an abutment adjustably mounted on said stem relative to said piston and adjustable thereon by manipulation of said stem from the exterior of said cylinder, said abutment being disposed in the path of movement of said piston for engagement thereby upon a spindle advancing stroke for unseating said valve member and positively stopping advancement of the spindle.

2. A vent valve comprising a valve housing, a valve seat in said housing, a valve member engageable with said seat, a plug adjustably mounted in said housing to the side of said valve member opposite said seat and including annularly arranged abutment means for limiting movement of said valve member to no more than a few thousandths of an inch, and a seal disposed between said valve member and said plug, said seal being radially confined by the abutment means and normally retaining the valve member on said seat.

3. A vent valve and stroke adjusting device for automatic drill units and the like comprising a housing having a bore therethrough, a valve seat in said housing concentric with said bore, a valve member movably mounted in said bore, means normally retaining said valve member in engagement with said seat, a plug adjustably mounted in said bore to the side of said valve member opposite said seat for limiting movement of said valve member to no more than a few thousandths of an inch, a stem journalled in said bore and extending freely through said plug and said valve member and projecting to opposite sides of said housing, said stem having a screw thread at one end thereof, an abutment threaded on said stem, and a retainer extending from said housing to said abutment for preventing rotation thereof.

4. In an automatic drill unit or the like comprising a drill spindle, cylinder and piston means for advancing and retracting said spindle, and fluid pressure responsive means for supplying pressure fluid to said cylinder and piston and including means for controlling the application of pressure to said cylinder and piston; a vent valve operably associated with said cylinder and piston and means for controlling the application of pressure to said cylinder and piston, said vent valve comprising in combination a valve housing disposed at one end of and secured to said cylinder, a valve seat, a vent valve movable relative to said seat, stop means adjustable relative to said valve and seat, resilient sealing means disposed between said stop means and vent valve normally retaining said vent valve in engagement with said valve seat, said housing, valve seat, vent valve and stop means being each apertured in alignment with the other and in a direction axially of said cylinder, a valve operating rod disposed in said apertures and having a portion exteriorly of said housing and a threaded portion in said cylinder extending in an axial direction therein, manually operable means secured to said rod exteriorly of said housing for manually rotating said rod, an abutment threaded on said threaded portion of said rod, and means carried by said housing holding said abutment against rotation, whereby rotation of said rod produces movement of said abutment in an axial direction relative to said cylinder and piston.

5. A drilling machine comprising a support, a spindle member rotatable and longitudinally slidable in said support, a first means operatively associated with the spindle the unit is very compact and of highly economical construction. Also, its disposition in coaxial relation to the piston means 31 results in an exceedingly compact overall assembly.

Relative to the compactness of the overall assembly, it is a particular object of the present invention to utilize the space that otherwise would have been employed as a fourth spindle actuating spindle and cylinder means as means for controlling the rate of advancement of the spindle and for causing different rates of advancement during different parts of the spindle advancing stroke. Specifically, I embody in this space a hydraulic retarding or dash pot means which is illustrated in part in FIGURE 1 and in greater detail in FIGURE 6.

The purpose of the dash pot means which I am about to describe is to accommodate rapid advancement of a drill to a work-piece, and then to cause the drill to be fed into the piece at a controlled rate depending upon the nature of the work-piece, the material from which the drill is formed and the seed of drill rotation. For example, if we were to assume on an exaggerated basis that a drill were to be fed into a work-piece at the rate of one inch per minute, whereas the unit is capable of advancing the drill at the rate of one inch per second, and that the starting position of the drill were one inch away from the work, 59 seconds would be wasted in bringing the drill to the work if the unit were adjusted simply to advance the drill at the selected working rate. On the other hand, the rate of feed cannot be ignored since drill life and accuracy of performance are directly dependent thereon. In view of these factors, my improved dash pot means includes, as will presently appear, first adjustable means accommodating high speed advancement of the spindle during a variable initial part of its stroke and second adjustable means for retarding advancement of the spindle at a variable rate during the terminal part of the stroke.

Referring now to FIGURES 1 and 6, the improved dash pot means of this invention is embodied directly within the fourth cylinder 43 defined in the housing 10 and includes the piston 41 reciprocable in said cylinder and the piston stem 44 secured to said piston. The piston 41 comprises a cylindrical shell or hollow tube and is adapted for slidable reception therein of a piston 124 which is provided with a rigid rod 125 extending axially through a supporting or guiding member 126 secured within the left end of the bore 13. To the inner side of this member, the rod 125 is provided with an integral radial flange 127 comprising a stop means adapted to abut against the member 126 to limit outward movement of the piston and its rod. Outwardly of the flange and supporting member, the rod is threaded for adjustable reception thereon of a control knob 128, which knob is exposed for manual adjustment at the same end of the drill as the stroke adjusting knob 120. The piston 124 and rod 125 are bored axially thereof for adjustable reception therein of a needle valve 129 which is adapted to cooperate with a valve seat 130 defined within the piston or a separate member secured thereto. The needle valve thus controls communication between the chamber 131 defined within the tubular piston 41 to the inner side of the piston 124 and the chamber 132 defined within the piston 41 to the outer side of the piston 124, the rod 125 including a radial bore establishing communication between its axial bore and the latter chamber. Preferably, the needle valve 129 is disposed entirely within the rod 124, in threaded engagement therewith, and is provided at its outer end with an Allen head which facilitates adjustment without engendering inadvertent manipulation of the valve, the valve being accessible from the same end of the unit as the control nut 128.

To the outer or forward side of the piston 124, a further piston 133 is slidably mounted in the tubular piston 41, the piston 133 also slidably engaging the rod 125 of the piston 124. As with the other piston means described hereinbefore, the pistons 124 and 133 are sealed relative to the tube 41 by suitable O-ring seals, and the piston 133 is sealed in a similar manner at its inner margin relative to the rod 125. The piston 133 is constantly biased toward the piston 124 by a coil compression spring 134 confined between the piston 133 and a retainer ring 135 secured within the free end portion of the tube 41. The piston 133 thus acts both as a closure for the chamber 132 and as the movable wall means of an expansible chamber for performing functions to be described hereinafter.

At the inner end of the dash pot means, the stem 44 of the piston 41 extends axially into the piston 40 and has a lost-motion connection 45 therewith as previously described. The stem 44 has an axial bore therethrough and a grease fitting 136 is secured within said bore at the free end of the stem. The piston 40, which is a hollow tube, is provided at its head end with a removable closure 137 and the cylinder means 42 is also provided with a removable head closure 138, which latter closure is sealed relative to the body 10 of the device by an O-ring seal 139. Upon removal of the closure members 137 and 138, access may be had to the fitting 136 for purposes of supplying hydraulic fluid to the chambers 131 and 132. In this respect, the chamber 132 is adapted, by virtue of its movable closure piston 133, to accommodate a supply of fluid in excess of the minimum quantity required for optimum functioning of the dash pot, the piston biasing spring 134 maintaining a minimum fluid pressure and a predetermined fluid level in the chambers despite depletion of the fluid therein due to leaks etc. Accordingly, the fluid supply need be replenished only infrequently, and then replenishment is readily effected upon removal of the closures 137 and 138.

In operation, upon advancement of the spindle as caused by the pistons 34 and 40, the piston 40 initially advances rapidly relative to the piston 41 and the stem 44 due to the lost-motion connection 45 therebetween. When the piston has taken up the lost-motion, which is equivalent generally to the minimum clearance between the drill and the work-piece, the piston 40 commences to move the piston 41 forwardly, i.e. to the left, and the retarder piston 124 is carried therewith until the flange 127 engages the guide member 126. Up until this point, movement of the pistons and spindle has been relatively rapid. However, when the flange 127 abuts against the member 126, movement of the piston 40 can be effected only at a rate proportional to the rate of fluid flow through the port of the needle valve in the piston 124, since the piston 124 is held against movement and the fluid in the chamber 131 is incompressible. At this stage in the operation of the apparatus, the chamber 131 becomes a high pressure chamber while the chamber 132 remains at the relatively low pressure imposed by the spring 134. As a consequence of the relatively low pressure in the chamber 132, the piston 133 is readily effective to maintain the chamber 132 and the entire dash pot means in sealed relation to atmosphere, whereby leakage is minimized. Also, the spring biased piston 133 maintains a constant minimum oil pressure in the unit, thereby to prevent occurrence of zero pressures and instantaneous pressure reversals, and further minimize leakage past the dynamic seals.

As fluid is by-passed through the needle valve means at a controlled rate between the high and low pressure chambers, the chamber 132 constitutes not only the volumetric space required for make-up oil to offset fluid losses, but also constitutes a volumetric space of variable size for absorbing the transferred oil. As oil is transferred from chamber 131 to chamber 132, the piston 40 and spindle 17 advance at a relative slow predetermined rate of feed, during which portion of the advancing stroke useful work is preformed on the work-piece. When the pistons 34, 35 and 40 have advanced the predetermined distance for which the abutment 89 of the reversing valve 83 has been set, the abutment halts the pistons and spindle, member for imparting rotation to the spindle member on its long axis, one end of the spindle member being adapted to mount a drill axially thereof, a collar fixed around the spindle member and having a hub portion thereof in engagement with the spindle member, a cylinder mounted on the support and extending parallel to the spindle member, the wall of the cylinder having a slot formed therein, a piston member in the cylinder and having a circumferential groove therearound, the collar extending through said slot and having a rim portion thereof in engagement with the groove in said piston member, one of said portions of the collar being rotatable with respect to one of said members, whereby movement of the piston member axially in the cylinder will impart axial movement to the spindle member, fluid passage means communicating with the cylinder for introducing fluid pressure behind the piston member to move the piston member in the direction of said one end of the spindle member, and further means operatively associated with the support and with the piston member to urge the piston member in an opposite direction.

6. A drilling machine comprising a support, a spindle member rotatable and longitudinally slidable in said support, a first means operatively associated with the spindle member for imparting rotation to the spindle member on its long axis, one end of the spindle member being adapted to mount a drill axially thereof, a collar fixed around the spindle member and having a hub portion thereof in engagement with the spindle member, a cylinder mounted on the support and extending parallel to the spindle member, the wall of the cylinder having a slot formed therein, a piston member in the cylinder and having a circumferential groove therearound, the collar extending through said slot and having a rim portion thereof in engagement with the groove in said piston member whereby movement of the piston member axially in the cylinder will impart axial movement to the spindle member, said spindle member being rotatable with respect to the collar, fluid passage means communicating with the cylinder for introducing fluid pressure behind the piston member to move the piston member in the direction of said one end of the spindle member, and further means operatively associated with the support and with the piston member to urge the piston member in an opposite direction.

7. In an automatic drill unit or the like having piston and cylinder means for advancing and retracting a drill spindle, fluid pressure responsive means for supplying pressure fluid to the piston and cylinder means and a vent valve actuated by the piston and cylinder means upon its spindle advancing stroke for controlling said fluid pressure responsive means to cause retraction of the spindle, the improvement wherein the vent valve comprises a housing having a valve seat, a valve member in said housing movable relative to said valve seat, a plug mounted in said housing and adjustably interacting therewith, said plug disposed adjacent a side of said valve member opposite said seat and including non-yielding abutment means adjustable thereby relative to said valve member and seat to predetermine the extent of movement of said valve member and plug, resilient means normally biasing said valve member in engagement with said seat, a stem extending from said valve member toward the movable element of said piston and cylinder means, and an abutment adjustably mounted on said stem for engagement by the said movable element upon its spindle advancing stroke for unseating said valve member and positively stopping advancement of the spindle.

References Cited in the file of this patent

UNITED STATES PATENTS

| | | |
|---|---|---|
| Re. 23,822 | Eschenburg et al. | May 4, 1954 |
| 52,957 | Bridge | Mar. 6, 1866 |
| 811,665 | Sage | Feb. 6, 1906 |
| 974,872 | Fournia | Nov. 8, 1910 |
| 1,740,794 | Taylor | Dec. 24, 1929 |
| 1,719,308 | Pospeshil | May 8, 1934 |
| 1,958,567 | Williams | May 8, 1934 |
| 2,384,977 | Swearingen | Sept. 18, 1945 |
| 2,573,993 | Sedgewick | Nov. 6, 1951 |
| 2,607,197 | Johnson | Aug. 19, 1952 |
| 2,657,595 | Shaff | Nov. 3, 1953 |
| 2,836,196 | Gunn | May 27, 1958 |
| 2,839,079 | Holmes | June 17, 1958 |

UNITED STATES PATENT OFFICE
CERTIFICATE OF CORRECTION

Patent No. 3,145,588                        August 25, 1964

Don R. King

It is hereby certified that error appears in the above numbered patent requiring correction and that the said Letters Patent should read as corrected below.

Column 12, line 25, after "limiting" insert -- the extent of --.

Signed and sealed this 12th day of January 1965.

SEAL)

test:

RNEST W. SWIDER
testing Officer

EDWARD J. BRENNER
Commissioner of Patents